United States Patent [19]

Morisada

[11] Patent Number: 5,317,702
[45] Date of Patent: May 31, 1994

[54] DEVICE FOR EFFECTIVELY CONTROLLING A BRANCH HISTORY TABLE FOR AN INSTRUCTION PREFETCHING SYSTEM EVEN IF PREDICTIONS ARE BRANCH UNSUCCESSFUL

[75] Inventor: Tsuyoshi Morisada, Tokyo, Japan

[73] Assignee: NEC Corporation, Tokyo, Japan

[21] Appl. No.: 527,911

[22] Filed: May 24, 1990

[30] Foreign Application Priority Data

May 25, 1989 [JP] Japan .................................. 132321

[51] Int. Cl.$^5$ .............................................. G06F 9/00
[52] U.S. Cl. ..................................... 395/375; 395/425;
    364/DIG. 1; 364/261.3; 364/263.1; 364/254
[58] Field of Search ...................... 395/375, 425, 400

[56] References Cited

U.S. PATENT DOCUMENTS

| | | | |
|---|---|---|---|
| 3,559,183 | 1/1971 | Sussenguth | 364/200 |
| 4,477,872 | 10/1984 | Losg et al. | 364/200 |
| 4,760,520 | 7/1988 | Shintani et al. | 364/200 |
| 4,763,245 | 8/1988 | Emma et al. | 364/200 |
| 4,764,866 | 8/1988 | Downey | 364/200 |
| 4,777,594 | 10/1988 | Jones et al. | 364/200 |
| 4,853,840 | 8/1989 | Shibuya | 364/200 |
| 4,943,908 | 7/1990 | Emma et al. | 395/375 |
| 4,984,154 | 1/1991 | Hanatani et al. | 395/375 |
| 4,991,080 | 2/1991 | Emma et al. | 395/375 |
| 5,088,030 | 2/1992 | Yoshida | 395/375 |
| 5,121,473 | 6/1992 | Hodges | 395/375 |

OTHER PUBLICATIONS

David J. Lilja, "Reducing the Branch Penalty in Pipelined Processors", Computer, Jul. 1988, pp. 47–55.

Primary Examiner—Alyssa H. Bowler
Assistant Examiner—Mehmet Geckil
Attorney, Agent, or Firm—Sughrue, Mion, Zinn, Macpeak & Seas

[57] ABSTRACT

For use in an instruction prefetching system for carrying out instruction prefetch in a data processing system in controlling a branch history table responsive to an instruction request address for producing a historical branch instruction address and a corresponding branch destination address, a device uses a detect mode which is determined by the prefetching system to indicate whether the branch destination address should or should not be used in the instruction prefetch. When the historical branch instruction address is retrieved from the table and furthermore when the branch destination address should be used, the branch destination address is actually used in the instruction prefetch. When the historical branch instruction address is retrieved and furthermore when the branch destination address should not be used, a signal is produced to indicate that the historical branch instruction address is found. In this event, the device does not send the branch destination address to the prefetching system. The device is particularly useful when a conditional branch instruction should be executed repeatedly a predetermined number of times.

2 Claims, 2 Drawing Sheets

DEVICE FOR EFFECTIVELY CONTROLLING A BRANCH HISTORY TABLE FOR AN INSTRUCTION PREFETCHING SYSTEM EVEN IF PREDICTIONS ARE BRANCH UNSUCCESSFUL

BACKGROUND OF THE INVENTION

The present invention relates to a device for use in an instruction prefetching system of a data processing system in controlling a branch history table arrangement which will presently be described. The device according to this invention can therefore be called a branch history table controlling device.

Various instruction prefetching systems are already known in the art. An example is disclosed in U.S. patent application Ser. No. 286,021 filed Dec. 19, 1988, as a continuation-in-part application by Syuichi Hanatani et al for assignment to the present assignee based on patent applications filed in Japan under Application No. 203,550/1982 and others.

According to the Hanatani et al application, the data processing system includes as usual an instruction address register for memorizing a request address signal representative of an instruction request address. Supplied with the request address signal, an instruction memory produces an instruction signal representative of an instruction from one of its memory addresses that is indicated by the request address signal. The instruction prefetching system is for carrying out instruction prefetch of successively prefetching such instructions along an instruction stream with each instruction prefetched as a current instruction at a time in compliance with the request address signal which is currently memorized in the instruction address register to represent a current request address.

The instruction stream may include a conditional branch instruction which indicates, depending on a condition, one of a branch direction of going to a branch destination or target instruction and a continued direction of not going to the branch destination instruction. The condition is indicated by an outcome obtained after a decoding cycle in which decoding is carried out on the conditional branch instruction prefetched prior to the decoding cycle. Until the decode cycle of the conditional branch instruction, the instruction prefetch proceeds along the branch and the continued directions when prediction is branch successful and branch unsuccessful, respectively.

In order to reduce a loss cycle time which is inevitable when the outcome is found to indicate that the prediction is either incorrect or correct, the instruction prefetching system preferably comprises either a branch history table (BHT) or a decode history table (DHT). The branch history table is revealed in U.S. Pat. No. 3,559,183 issued to Edward H. Sussenguth. The decode history table is revealed in U.S. Pat. No. 4,477,872 issued to Jacques J. Losq et al and is alternatively called a decode-time history table.

The branch history table is for memorizing a plurality of signal pairs. Each signal pair comprises a branch instruction address signal and a branch destination address signal. Previous to prefetch of a conditional branch instruction as a current branch instruction, it is usual that the conditional branch instruction is already prefetched as a previously executed branch instruction and subsequently decoded to produce a historical outcome. Only when the historical outcome indicates that the prediction should have been branch successful, the branch instruction address signal indicates the memory address of the previously executed branch instruction as a previously executed branch instruction address. The branch destination address signal represents a branch destination address which corresponds to the previously executed branch instruction address and is obtained when the previously executed branch instruction was subjected to execution.

In the manner described in the above-cited Hanatani et al application, a retrieving arrangement is connected between the instruction address register and the branch history table for use in retrieving one of the branch instruction address signals of the signal pairs that represents a branch instruction address indicated by the request address signal representative of the current request address. When such a branch instruction address is located, the branch history table produces the branch destination address signal representative of the corresponding branch destination address for use in continuing the instruction prefetch from the branch destination instruction which is represented by an instruction signal produced when the corresponding branch destination address is used in accessing the memory address.

A combination of the branch history table and the retrieving arrangement is herein referred to as the branch history table arrangement. Inasmuch as the signal pairs are memorized only when the historical outcome indicated that the prediction should have been branch successful, the branch history table arrangement is not effective when the prediction should have been branch unsuccessful in connection with a branch instruction which should be prefetched.

The decode history table is for memorizing a plurality of signal pairs like the branch history table. Each signal pair represents a historical branch instruction and a historical outcome which indicates either of branch successful and unsuccessful. The branch destination instruction is therefore fetched after the decode cycle of the conditional branch instruction which is located in the decode history table as one of the previously executed branch instructions represented by the signal pairs. This is undesirable in carrying out the instruction prefetch.

SUMMARY OF THE INVENTION

It is therefore an object of the present invention to provide a device for effectively controlling a branch history table arrangement even when prediction is branch unsuccessful in connection with a conditional branch instruction which is included in an instruction stream being prefetched.

It is another object of this invention to provide a device of the type described, which makes a branch history table operable like a decode history table.

Other objects of this invention will become clear as the description proceeds.

On describing the gist of this invention, it is possible to understand that a branch history table controlling device is for use in an instruction prefetching system for carrying out instruction prefetch in controlling a branch history table device which is supplied with a request address signal representative of a current request address for producing a signal pair of a branch instruction address signal representative of a historical branch instruction address and a branch destination address signal representative of a branch destination address corresponding to the historical branch instruction address.

According to this invention, the above-described device comprises: (1) a detect mode register for indicating a detect mode signal indicative of, in relation to the current request address, whether the branch destination address signal should or should not be used in the instruction prefetch; (2) a detection signal producing device supplied with the request address signal and the branch instruction address signal for producing a detection signal indicative of whether or not the current request address coincides with the historical branch instruction address; (3) a first signal register device connected to the detect mode memory and the detection signal producing device for indicating, when the detect mode signal indicates that the branch destination address signal should be used in the instruction prefetch, a first signal indicative of whether the instruction prefetch should or should not proceed in accordance with the branch destination address signal; and (4) second a signal register device connected to the detect mode memory and the detection signal producing device for indicating, when the detect mode signal indicates that the branch destination address signal should not be used in the instruction prefetch, a second signal indicative of whether or not the current request address coincides with the historical branch instruction address.

DESCRIPTION OF THE PREFERRED EMBODIMENT

Figure 1:
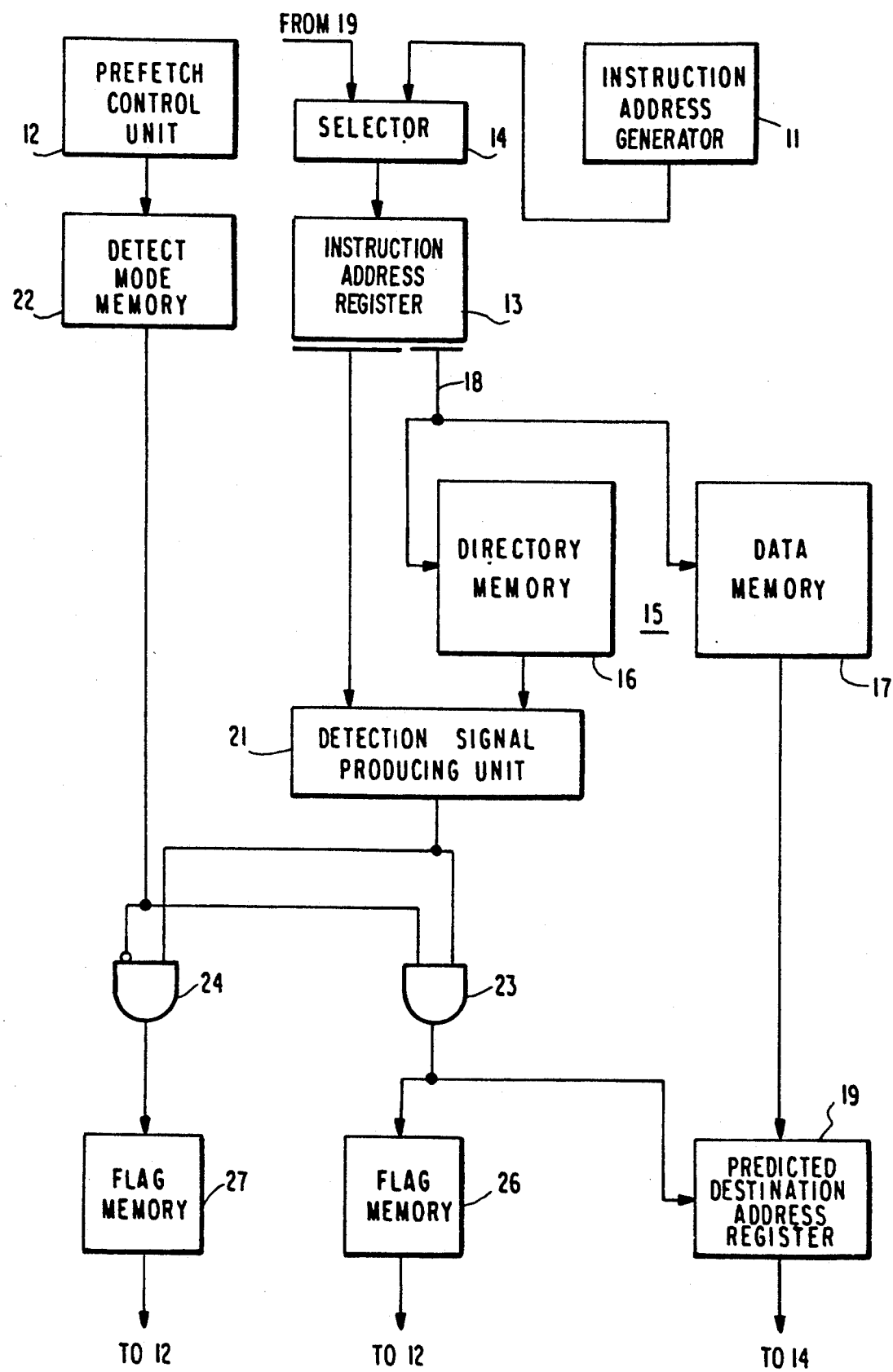
FIG. 1 shows in blocks a branch history table controlling device according to an embodiment of the instant invention together with a part of a data processing/system.

Referring to FIG. 1, an instruction prefetching system of a data processing system comprises a branch history table controlling device according to a preferred embodiment of the present invention. The data processing system includes an instruction address generator 11 for generating a request address signal representative of an instruction request address. The instruction prefetching system comprises a prefetch control unit 12 which will become clear as the description proceeds.

In the instruction prefetching system, an instruction address register (IAR) 13 is for memorizing the request address signal supplied thereto from the instruction address generator 11 through an input selector 14. A branch history table (BHT) 15 comprises a directory memory 16 and a data memory 17 which are for cooperatively memorizing a plurality of signal pairs. Each signal pair comprises a branch instruction address signal memorized in the directory memory 16 and a branch destination or target address signal memorized in the data memory 17.

The instruction prefetching system is for carrying out instruction prefetch of successively prefetching instructions along an instruction stream. During progress of the instruction prefetch, each instruction is prefetched as a current instruction at a time from one of memory addresses of an instruction memory (not shown) of the data processing system that is indicated by the request address signal currently memorized in the instruction address register 13 to represent a current request address.

A conditional branch instruction may be included in the instruction stream to indicate, depending on a condition, one of a branch direction of going to a branch destination instruction and a continued direction of not going to the branch destination instruction. The condition becomes evident when an outcome is obtained after an instruction decoder (not shown) of the data processing system decodes the conditional branch instruction in a decode cycle of the conditional branch instruction. Until the decode cycle, the instruction prefetch proceeds along the branch and the continued directions when the instruction prefetch is predicted or guessed to proceed along the branch and the continued directions, namely, when prediction is branch successful and branch unsuccessful, respectively.

The branch history table 15 is used on carrying out the prediction. More particularly, it will be assumed that a conditional branch instruction is prefetched as a current branch instruction. Previous to prefetch of the current branch instruction, the conditional branch instruction is usually prefetched at least once as a previously executed branch instruction and subsequently decoded to provide a historical outcome. Only when the historical outcome indicates that the prediction of branch successful is correct, the branch instruction address signal is stored in the directory memory 16 to represent a historical instruction address which indicates the memory address used in the instruction memory in memorizing the previously executed branch instruction. When the historical outcome indicates that the prediction of branch successful is incorrect, namely, that the prediction of branch unsuccessful is correct, the directory memory 16 is not loaded with the branch instruction address signal. When such branch instruction address signals are stored in the directory memory 16, branch destination address signals are stored in the data memory 17 in correspondence to the respective branch instruction address signals so that each branch destination address signal represents a branch destination address which corresponds to the historical instruction address and was previously obtained by execution of the previously executed branch instruction. It is therefore possible to briefly say that the branch history table 15 memorizes such historical instruction addresses in the directory memory 16 and the corresponding branch destination addresses in the data memory 17.

A signal lead 18 is connected to the instruction address register 13 and to the directory and the data memories 16 and 17 of the branch history table 15. The signal lead 18 is for use in retrieving, in the manner described in the above-referenced Hanatani et al application, one of the historical instruction addresses as a particular instruction address in response to the request address signal which is memorized in the instruction address register 13 to represent the current request address for use in prefetching the current branch instruction from the instruction memory.

A little more in detail, the request address signal comprises first and second request address parts deleted as more and less significant bits thereof in the manner known in the art. In correspondence, each branch instruction address signal comprises first and second instruction address parts. The second request address part is supplied to the directory and the data memories 16 and 17 among the request address signal representative of the current request address. It will now be presumed in connection with the current branch instruction that the historical outcome indicated that the prediction of branch successful was correct. In this event, the particular instruction address is memorized in the directory memory 16.

Under the circumstances, the directory memory 16 is retrieved by the second request address part to produce the first instruction address part of one of the branch instruction address signals that represents the particular instruction address. Retrieved by the second request address part, the data memory 17 produces one of the branch destination address signals that represents the branch destination address corresponding to the particular instruction address and serves as a corresponding destination address.

As regards the current branch instruction, the corresponding destination address serves as a predicted destination address which will become clear when the current branch instruction is executed in due course. The branch destination address signal representative of the predicted destination address is delivered to a predicted destination address register 19. It is now understood that a combination of the branch history table 15 and the signal lead 18 is what is referred to hereinabove as the branch history table arrangement or means.

The instruction prefetch proceeds with no loss cycle time if the prediction of branch successful is correct in connection with the current branch instruction. It is to be noted here that no branch instruction address signal is memorized in the branch history table 15 if the historical outcome indicated that the prediction of branch unsuccessful was correct. An appreciable loss cycle time is inevitable either when the particular instruction address is located in the branch history table 15 in connection with the current branch instruction which is later found to indicate branch unsuccessful or when no historical branch instruction address is located in the branch history table 15 in connection with the current branch instruction which is later found to indicate branch successful.

Connected to the instruction address register 13 and to the directory memory 16 of the branch history table 15, an instruction address comparator 21 compares the first request address part with the first instruction address part of the branch instruction address signal which represents the particular instruction address The instruction address comparator 21 thereby produces a detection signal which has first and second logic levels, such as a logic one level and a logic zero level, when the first request address part is and is not coincident with the first instruction address part, respectively.

The instruction address comparator 21 therefore serves as a detection signal producing unit or arrangement and is so labelled in FIG. 1. The detection signal producing unit 21 is for producing the detection signal in response to the request address signal and the branch instruction address signal under consideration. The detection signal indicates whether or not the current request address coincides with one of the historical instruction addresses that is named the particular instruction address before.

Connected to the prefetch control unit 12, a detect mode memory 22 is for memorizing a detect mode signal which the prefetch control unit 12 produces whenever the request address signal is newly stored as the current request address in the instruction address register 13. It is noted that the instruction stream may include a different branch instruction which will presently be exemplified. Instructions other than the conditional and the different branch instructions will herein be called ordinary instructions.

The different branch instruction may be an unconditional branch instruction which indicates that the instruction prefetch should always proceed to the branch destination instruction. The different branch instruction may alternatively be a cyclic branch instruction, for which the condition indicates repeated use of the branch distination instruction a predetermined number of times and then indicates use of an instruction which is next subsequent in the instruction stream to the cyclic branch instruction under consideration and may be either an ordinary instruction or another branch instruction. During the repeated use of the branch destination instruction, the prediction should be branch successful and is always correct. Immediately after the repeated use, the prediction should be branch unsuccessful. For later prefetch of the cyclic branch instruction in question, the prediction should be put back to branch successful.

The prefetch control unit 12 gives the first logic level to the detect mode signal when the current request address is used in prefetching, as the current branch instruction, a branch instruction which is, for example, a cyclic branch instruction during the repeated use of the branch destination instruction and for which the prediction should be branch successful. The prediction control unit 12 gives the second logic level to the detect mode signal when the current request address is used in prefetching either an ordinary instruction or a branch instruction which is, for example, the cyclic branch instruction immediately after the repeated use of the branch destination instruction and for which the prediction should be branch unsuccessful.

It is now understood in connection with the request address signal which is currently memorized in the instruction address register 13 to represent the current request address that the detect mode signal indicates, when the detection signal indicates coincidence of the current request address with the particular instruction address, whether or not the predicted destination address should be used in the instruction prefetch. It is readily possible to make the prefetch control unit 12 produce such a detect mode signal. For example, a counter (not shown) may be used in the prefetch control unit 12 to count in connection with each cyclic branch instruction how many times the branch destination address is used, namely, how many times the cyclic branch instruction in question is executed. The detect mode signal is given the first and the second logic levels depending on a count in the counter.

An AND gate 23 has two input terminals connected to the detection signal producing unit 21 and to the detect mode memory 22 to produce an AND output signal which has one of the first and the second logic levels at a time. An inhibit gate 24 has an input terminal connected to the detection signal producing unit 21 and an inhibit input terminal connected to the detect mode memory 22 to produce an inhibit gate output signal having either the first or the second logic level.

Supplied with the AND output signal of the first logic level as a strobe signal, the predicted destination address register 19 is activated to supply the branch destination address signal representative of the predicted destination address to the input selector 14 and thence to the instruction address register 13 in the manner described in the Hanatani et al application. Alternatively, the branch destination address signal under consideration is delivered to the instruction address generator 11. In either event, the instruction prefetch proceeds with the prediction of branch successful, namely, with the branch destination instruction prefetched from the memory address which is indicated in the instruction memory by the branch destination address signal in question. When the strobe signal has the second logic level, the predicted destination address register 19 is not activated. The branch destination address signal in question is kept in the predicted destination address register 19.

Connected to the AND gate 23, a first flag memory 26 is for memorizing the AND output signal as a first signal or flag. Connected to the inhibit gate 24, a second flag memory 27 is for memorizing the inhibit gate output signal as a second signal or flag. Each of the first and the second flag memories 26 and 27 is a one-bit memory, such as a flip-flop circuit. Each of the first and the second signals has one of the first and the second logic levels at a time and is delivered back to the prefetch control unit 12.

When the current request address is coincident with the particular instruction address and furthermore when the detect mode signal indicates that the predicted destination address should be used in the instruction prefetch, the first signal has the first logic level. Otherwise, the first signal has the second logic level.

Consequently, the first signal of the first logic level indicates that the instruction prefetch should proceed in accordance with the predicted destination address. This first signal may be used in making the prefetch control unit 12 control the input selector 14 so that the branch destination address signal representative of the predicted destination address be supplied from the predicted destination address register 19 to the instruction address register 13.

When the current request address is coincident with the particular instruction address and furthermore when the detect mode signal indicates that the predicted destination address should not be used in the instruction prefetch, the second signal has the first logic level. Otherwise, the second signal has the second logic level.

Therefore, the second signal of the first logic level indicates that the instruction prefetch should not proceed in accordance with the predicted destination address but should proceed with the prediction of branch unsuccessful. This second signal may be used in making the prefetch control unit 12 control the input selector 14 so that the request address signal be supplied from the instruction address generator 11 to the instruction address register 13.

As a consequence, the branch history table controlling device is very convenient in dealing with a cyclic branch instruction. In addition, it is understood that a combination of the first and the second signals indicates whether the prediction should be branch successful or unsuccessful. The branch history table controlling device thereby makes the branch history table arrangement operable like a decode history table described heretobefore.

Incidentally, a combination of the AND gate 23 and the first flag memory 26 is herein called a first signal memory arrangement and another combination of the inhibit gate 24 and the second flag memory 27, a second signal memory arrangement. Connected to the detect signal memory 22 and the detection signal producing unit 21, the first signal memory arrangement is for memorizing, when the detect mode signal indicates that the branch destination address signal representative of the predicted destination address should be used in the instruction prefetch, the first signal which indicates whether the instruction prefetch should or should not proceed in accordance with the predicted destination address. Connected to the detect mode memory 22 and the detection signal producing unit 21, the second signal memory arrangement is for memorizing, when the detect mode signal indicates that the predicted destination address should not be used in the instruction prefetch, the second signal which indicates whether the current request address is or is not coincident with the particular instruction address.

Figure 2:
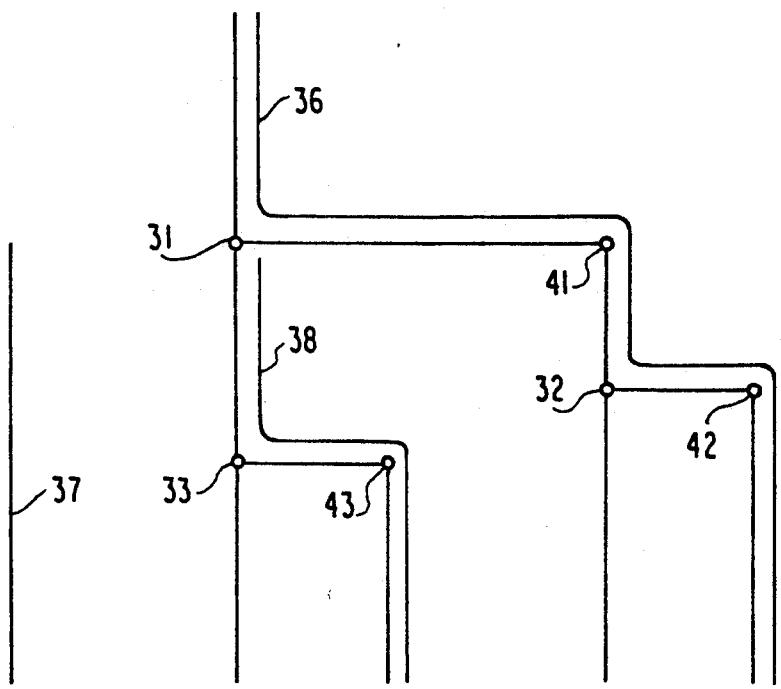
FIG. 2 shows a few instruction streams for use in describing operation of an instruction prefetching system which includes the device depicted in FIG. 1.

Referring now to FIG. 2, first through third conditional branch instructions 31, 32, and 33 and first through third instruction streams 36, 37, and 38 are illustrated. The first conditional branch instruction 31 directs the first instruction stream 36 to a first branch destination instruction 41 with the prediction of branch successful. The second conditional branch instruction 32 directs the first instruction stream 36 further to a second branch destination instruction 42 with the prediction of branch successful.

The second instruction stream 37 includes no conditional branch instruction insofar as depicted. The third instruction stream 38 starts when the first conditional branch instruction 31 is prefetched and is executed in due course to indicate that the prediction of branch successful is incorrect. In the third instruction stream 38, the third conditional branch instruction 33 directs the third instruction stream 38 to a third branch destination instruction 43 with the prediction of branch successful. It should be understood in connection with the above that no instruction is included in each horizontal line between one of the conditional branch instructions 31 through 33 and one of the branch destination instructions 41 through 43.

When the instruction prefetch proceeds along the first instruction stream 36 to the first conditional branch instruction 31 which was ever executed as a historical branch instruction to produce a historical outcome indicative of branch successful, the branch history table 15 produces the branch destination address signal which represents the predicted destination address indicative of the memory address of the first branch destination instruction 41. When the detect mode signal indicates in the detect mode memory 22 that the instruction prefetch should further proceed in accordance with the predicted destination address, the first signal makes the prefetch control unit 12 use the predicted destination address. When the detect mode signal indicates that the predicted destination address should not be used, the prefetch control unit 12 is made by the second signal to switch the first instruction stream 36 to the third instruction stream 38.

While this invention has thus far been described in specific conjunction with only one preferred embodiment thereof, it will now be readily possible for one skilled in the art to put this invention into practice in various other manners. For example, it is possible to make the prefetch control unit 12 selectively give the first and the second logic levels to the detect mode signal in a manner different from that described in connection with a cyclic branch instruction, which may now be looked upon as a conditional branch instruction of a sort. The strobe signal of the second logic level may be used so as not to load the predicted destination address register 19 with the branch destination address signal representative of the predicted destination address. In other words, the predicted destination address register 19 may be prevented by the strobe signal of the second logic level from memorizing the branch destination address signal in question.

The first and the second logic levels may be differently given to the detect mode signal, the detection signal, the strobe signal, and the first and the second signals. Depending on the logic levels, an inhibit gate should be used in producing the strobe and the first signals with an AND gate used in producing the second signal. If the detect mode signal is given the first and the second logic levels when the predicted destination address should and should not be used in the instruction prefetch, the detection signal may be given a predetermined one and a different one of the first and the second logic levels when the instruction request address is and is not coincident with the particular instruction address, respectively. Under the circumstances, the strobe and the first signals may be given a preselected one and the other of the first and the second logic levels when the instruction prefetch should and should not proceed in accordance with the predicted destination address, respectively. The second signal may be given one and the other of the first and the second logic levels. It is possible to refer to each of the AND and the inhibit gates as a logic gate. The detect mode memory 22 may be a one-bit memory.

What is claimed is:

1. A device for use in an instruction prefetching system for carrying out instruction prefetch in controlling branch history table means supplied with a request address signal representative of a current request address for producing a signal pair of a branch instruction address signal representative of a previously executed branch instruction address and a branch destination address corresponding to said previously executed branch instruction address, said device comprising:
   a prefetch control unit for outputting a detect mode signal;
   a detect mode register for receiving and memorizing the detect mode signal output from said prefetch control unit, said detect mode signal being indicative of, in relation to said current request address, whether said branch destination address signal should or should not be used in the instruction prefetch;
   detection signal producing means connected to the branch history table means and supplied with said request address signal and said branch instruction address signal for producing a detection signal indicative of whether or not said current request address coincides with said previously executed branch instruction address;
   first signal register means connected to said detect mode register and said detection signal producing means for indicating, when said detect mode signal indicates that said branch destination address signal should be used in the instruction prefetch, a first signal indicative of whether the instruction prefetch should or should not proceed in accordance with said branch destination address signal; and
   second signal register means connected to said detect mode register and said detection signal producing means for indicating, when said detect mode signal indicates that said branch destination address signal should not be used in the instruction prefetch, a second signal indicative of whether or not said current request address coincides with said historical branch instruction address;
   said detect mode register memorizes said detect mode signal with first and second logic levels when said branch destination address signal should and should not be used in the instruction prefetch, respectively;
   said detection signal producing means producing said detection signal with a predetermined one and a different one of said first and said second logic levels when said current request address is and is not coincident with said previously executed branch instruction address, respectively;
   said first signal register means memorizing said first signal with a preselected one and the other of said first and said second logic levels when the instruction prefetch should and should not proceed in accordance with said branch destination address signal, respectively, said preselected one of the first and the second logic levels depending on said predetermined one of the first and the second logic levels.

2. A device as claimed in claim 1, wherein
said first signal register means comprises:
a logic gate connected to said detect mode register and said detection signal producing means for producing a gate output signal which has said preselected one of the first and the second logic levels only when said detect mode signal has said first logic level with said detection signal given said predetermined one of the first and the second logic levels and which has otherwise said other of the first and the second logic levels; and
a register connected to said logic gate for indicating said gate output signal as said first signal;
said device further comprising a predicted destination address register connected to said branch history table means and said logic gate for producing and for not producing said branch destination address signal when said gate output signal has said preselected one and said other of the first and the second logic levels, respectively.

* * * * *